Patented June 24, 1941

2,246,599

UNITED STATES PATENT OFFICE 2,246,599

PROCESS OF MAKING HIGHER FATTY ACID ANHYDRIDES

Horace Finningley Oxley and Edward Boaden Thomas, Spondon, near Derby, England, assignors to Celanese Corporation of America, a corporation of Delaware No Drawing. Application December 7, 1938, Serial No. 244,384. In Great Britain December 17, 1937

6 Claims. (Cl. 260—398)

This invention relates to the manufacture of anhydrides of higher fatty carboxylic acids.

We have found that the production of carboxylic acid anhydrides from acetic anhydride or other anhydride of a lower acid, i. e. one containing a smaller number of carbon atoms than the acid corresponding to the anhydride required, and the acid of the anhydride desired can be effected on the commercial scale simply, economically and so as to obtain a high conversion of the higher acid which is in general much more expensive than acetic anhydride, by passing the vapours of the lower anhydride through the higher acid maintained in the liquid phase, preferably at a temperature above the boiling point of the lower anhydride under the working conditions, and allowing the vapours of the lower acid produced to escape from the reaction zone. The higher acid, if not liquid at ordinary temperatures, is preferably maintained in the liquid phase by fusion though the use of inert solvents is not excluded.

The following examples illustrate the invention:

Example 1

Redistilled commercial lauric acid having an equivalent weight of 204 is heated at 90–100° C. under a pressure of 25 mm. in a vacuum distillation apparatus into which is admitted at a constant rate, below the surface of the molten acid, acetic anhydride of 99% concentration. Using an initial quantity of the redistilled lauric acid of 2,000 parts by weight, 1,500 parts by weight of the acetic acid anhydride are passed in the course of 6 hours.

The distillate obtained during the first part of the reaction period consists chiefly of acetic acid. During the progress of the reaction, the proportion of acetic anhydride gradually rises and finally approximates to the 99% concentration of the feed showing that substantially the whole of the lauric acid has been converted.

The temperature of the liquid in the distillation vessel is finally raised to 150° C. in order to remove unreacted acetic anhydride.

Example 2

2,560 parts by weight of palmitic acid are heated at 190–200° C. in a distillation apparatus for 18 hours at atmospheric pressure, while admitting, below the surface of the molten acid, 3,500 parts by weight of 95% acetic anhydride. The distillate at first consists mainly of acetic acid but the concentration of acetic anhydride eventually attains 90%. The product remaining in the distillation vessel consists largely of palmitic anhydride and is freed from traces of acetic anhydride by crystallisation from ethyl acetate.

A still higher conversion can be obtained by carrying out the reaction under reduced pressure at a lower temperature.

Example 3

1,285 parts by weight of commercial stearic acid is heated at 150–160° C. for 6 hours in a distillation apparatus at atmospheric pressure while continuously admitting below the surface of the liquid acetic anhydride of 96.5% concentration. Towards the end of the distillation the distillate collected contains 95.4% of acetic anhydride. The product remaining in the distillation vessel, consisting largely of stearic anhydride, is recrystallised from ethyl acetate.

Example 4

1,136 parts by weight of stearic acid is heated in a vacuum distillation apparatus at 90–100° C. under a pressure of 10–20 mm. and 1,000 parts by weight of 98.4% acetic anhydride is introduced below the surface of the molten acid during 4 hours. The temperature is then raised for a short time to 200° C. in order to expel the small quantity of unreacted acetic anhydride. The yield of stearic acid is substantially theoretical and the conversion over 90%.

The process can also be carried out continuously. A convenient method of doing this is to introduce the vapours of acetic anhydride near the bottom of a column maintained at a temperature above the boiling point of the anhydride and to cause the liquid higher acid to drip from plate to plate down the column from a point near the top. The vapours of acetic anhydride and acetic acid pass from the top of the column to condensation apparatus or, if desired, to a fractionating column and the higher anhydride (which may be in admixture with some unchanged higher acid or may be substantially free from higher acid) is drawn off from the bottom of the column.

The invention is applicable to the production of carboxylic acid anhydrides other than those specified above, for example those of propionic, normal and iso-butyric, caproic, caprylic, capric and myristic acids, of acids containing aromatic groups, for example benzoic and phenyl acetic and α- and β-naphthoic acids, of unsaturated acids, for example oleic and cinnamic acids, and of acids containing more than one carboxyl group, for example succinic acid. The invention is of particular importance in the production of anhydrides of fatty acids containing at least 8 carbon atoms. Preferably, as indicated above, acetic anhydride is employed as the lower anhydride since this is the most readily available of such anhydrides. Other lower anhydrides can, however, be employed in place of acetic.

Having described our invention, what we desire to secure by Letters Patent is:

1. Process for the production of anhydrides of carboxylic acids which comprises causing a carboxylic acid to react with the anhydride of a lower fatty acid to produce the anhydride of the higher acid together with the lower acid, by introducing the vapors of the lower anhydride below the surface of a body of the higher acid maintained in the molten state above the boiling point of the lower anhydride, and allowing the vapors of the lower acid produced to escape from the reaction zone.

2. Process for the production of anhydrides of carboxylic acids which comprises causing a carboxylic acid to react with the anhydride of a lower fatty acid to produce the anhydride of the higher acid together with the lower acid, by introducing the vapors of the lower anhydride below the surface of a body of the higher acid maintained under reduced pressure in the molten state above the boiling point of the lower anhydride at said reduced pressure, and allowing the vapors of the lower acid produced to escape from the reaction zone.

3. Process for the production of an anhydride of a fatty acid containing at least eight carbon atoms, which comprises causing said acid to react with acetic anhydride to produce the desired anhydride together with acetic acid by introducing the vapors of acetic anhydride below the surface of a body of the higher acid maintained under reduced pressure in the molten state at a temperature above the boiling point of acetic anhydride at said pressure, and allowing the vapors of acetic acid produced to escape from the reaction zone.

4. Process for the production of stearic anhydride, which comprises causing stearic acid to react with acetic anhydride to produce stearic anhydride and acetic acid by introducing the vapors of the acetic anhydride below the surface of a body of stearic acid maintained under reduced pressure in the molten state at a temperature above the boiling point of acetic anhydride at said pressure, and allowing the vapors of acetic acid produced to escape from the reaction zone.

5. Process for the production of palmitic anhydride, which comprises causing palmitic acid to react with acetic anhydride to produce palmitic anhydride and acetic acid by introducing the vapors of the acetic anhydride below the surface of a body of palmitic acid maintained under reduced pressure in the molten state at a temperature above the boiling point of acetic anhydride at said pressure, and allowing the vapors of acetic acid produced to escape from the reaction zone.

6. Process for the production of lauric anhydride, which comprises causing lauric acid to react with acetic anhydride to produce lauric anhydride and acetic acid by introducing the vapors of the acetic anhydride below the surface of a body of lauric acid maintained under reduced pressure in the molten state at a temperature above the boiling point of acetic anhydride at said pressure, and allowing the vapors of acetic acid produced to escape from the reaction zone.

HORACE FINNINGLEY OXLEY.
EDWARD BOADEN THOMAS.